INVENTOR
Donald G. Smellie
BY
ATTORNEY

Sept. 15, 1942.                D. G. SMELLIE                2,295,973
                              REFRIGERATION
                        Filed Aug. 17, 1939        2 Sheets-Sheet 2
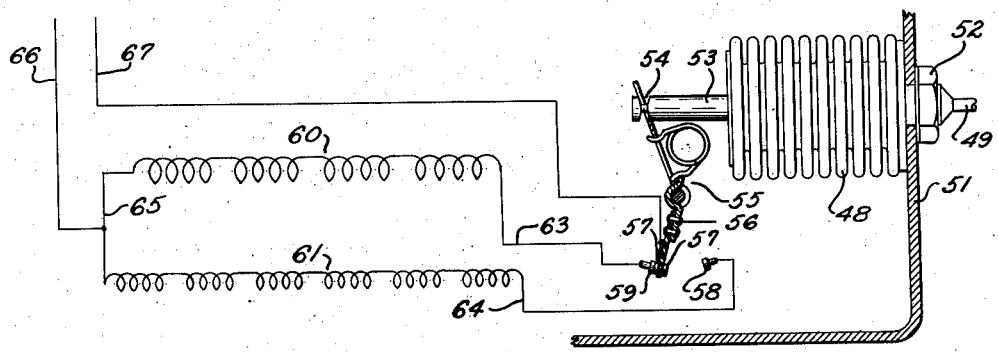
Fig. 2
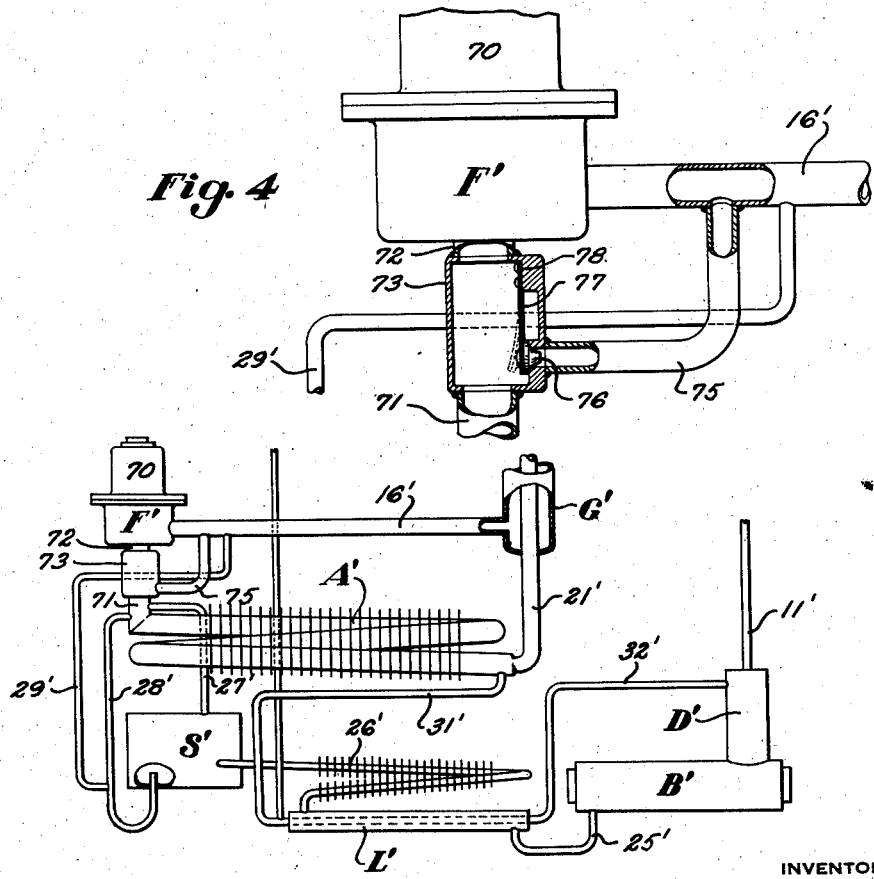
Fig. 4
Fig. 3
INVENTOR
Donald G. Smellie
BY
Harry T. Dumass
ATTORNEY Patented Sept. 15, 1942

2,295,973

UNITED STATES PATENT OFFICE 2,295,973

REFRIGERATION

Donald G. Smellie, Canton, Ohio, assignor to The Hoover Company, North Canton, Ohio Application August 17, 1939, Serial No. 290,577

16 Claims. (Cl. 62—5)

The invention relates to the art of refrigeration and more particularly to a novel absorption refrigerating apparatus of the three-fluid type so constructed and arranged that the system automatically and instantaneously adjusts itself to variations in operating conditions.

Refrigerating systems constructed previously have been subject to a serious disadvantage in that the operating efficiency and other characteristics of the system decrease at high room temperatures; that is, when the temperature of the cooling medium for the various heat rejecting portions of the system is at a high value. A particular characteristic of such systems is that they are unable to evaporate the liquid refrigerant supplied to the evaporator at high room temperature conditions which liquid refrigerant is then returned to the absorption solution circuit and represents a direct waste of the heat supplied to vaporize the same in the generator. Various attempts in the past have been made to overcome this difficulty by incorporating within the system various pieces of apparatus which in effect change the charge of the system. However, these devices are not altogether functionally satisfactory and they represent a very appreciable increase in the cost of the apparatus and in the bulk thereof as well as requiring the provision of a quantity of operating fluid which is inoperative the greater part of the time.

Accordingly, it is a principal object of the present invention to provide an absorption refrigerating system of the three-fluid type in which variations in operating conditions are automatically compensated by the system to maintain the operating efficiency and characteristics thereof without the provision of cumbersome and expensive auxiliary apparatus and without altering the effective charge in the system.

It is a principal object of the present invention to provide a three-fluid absorption refrigerating apparatus so constructed and arranged that the rate at which the absorption solution and inert gas are circulated varies directly and proportionately to a controlling operating condition to maintain desirable operating characteristics under all conditions.

It is a still further object of the present invention to provide a three-fluid absorption refrigerating system so constructed and arranged that the effective flow producing pressure differential in the inert gas circuit and the effective pressure of the pumping gas supplied to the solution circulating pump are varied directly in accordance with variations in the temperature of the cooling air flowing across the absorber and condenser in order to maintain the operating characteristics of the system with variable room temperatures.

It is a still further object of the present invention to provide a three-fluid absorption refrigerating apparatus including means which will vary the rate of circulation of the lean inert gas and of the absorption solution in conformity with variations in the refrigerant vapor concentration of the lean inert gas induced by alterations in operating conditions.

Other and further objects of the invention will become apparent as the description proceeds when taken in connection with the accompanying drawings in which:

Figure 2 is a schemmatic detail wiring diagram on an enlarged scale of the control device associated with the invention of Figure 1.

Figure 3 is a diagrammatic representation of a modified form of the invention.

Figure 4 is a partial sectional detail view on an enlarged scale of a portion of the apparatus included in Figure 3.

Figure 1:
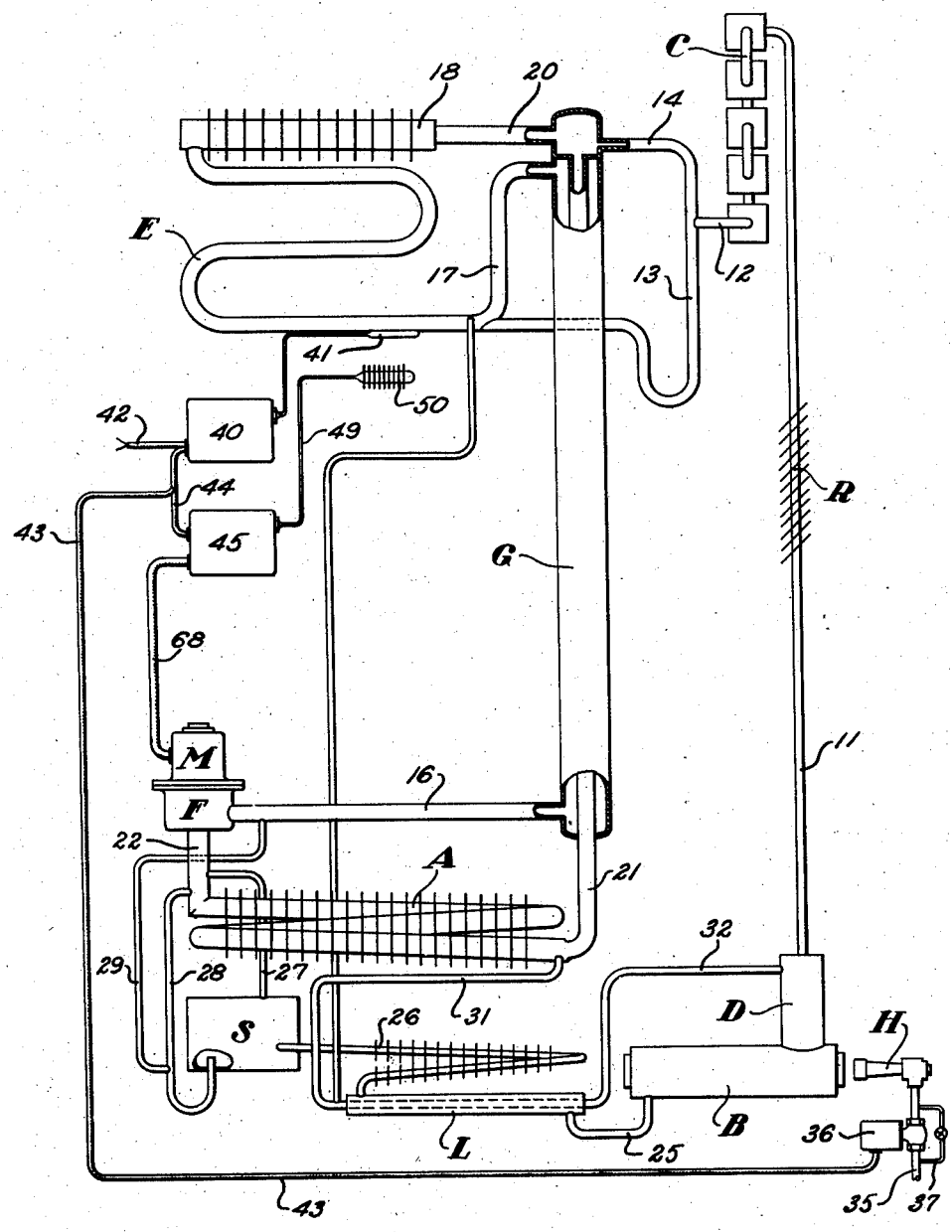
Figure 1 is a diagrammatic representation of a three-fluid absorption refrigerating system embodying the present invention.

Referring now to the drawing in detail and first to Figures 1 and 2 thereof, there is disclosed a continuous three-fluid absorption refrigerating system embodying a boiler B, an analyzer D, an air-cooled rectifier R, a tubular air-cooled condenser C, an evaporator E, a gas heat exchanger G, a liquid heat exchanger L, a solution reservoir S, an inclined tubular air-cooled absorber A, and a circulating fan F which is driven by a suitable electrical motor M. The above described elements are interconnected by various conduits to provide a plurality of gas and liquid circuits constituting a complete refrigerating system to which reference will be made in more detail hereinafter.

The above described refrigerating system will be charged with a suitable refrigerant, such as ammonia, a suitable absorbent therefor, such as water, and an inert pressure equalizing medium, preferably a dense inert gas, like nitrogen.

The boiler B is heated in any desired or preferred manner. As illustrated, a combustible fuel burner H, to which reference will be made in more detail hereinafter, is provided.

The application of heat to the boiler B generates refrigerant vapor from the refrigerant absorbent solution therein contained. The vapor so generated passes upwardly through the analyzer D in counterflow to strong solution flowing downwardly therethrough. The refrigerant vapor is then conveyed from the upper portion of the analyzer to the upper portion of the condenser C by way of the conduit 11 which includes the rectifier R.

The refrigerant vapor supplied to the condenser C is liquefied therein by heat exchange with cooling air and the liquid is conveyed to the bottom portion of the evaporator E by way of the conduit 12 and the conduit 13 which includes a downwardly extending U-shaped portion designed to form a pressure balancing liquid column to maintain a pressure differential between the evaporator and the condenser. The upper portion of the condenser side of the conduit 13 is vented to the rich gas side of the gas heat exchanger G by means of a conduit 14. Due to the high gas flow resistance of the evaporator the pressure within the rich gas side of the gas heat exchanger G is appreciably below that prevailing at the point in which the liquid refrigerant is supplied to the evaporator wherefore a pressure balancing column is formed in the conduit 13.

The liquid refrigerant which is supplied to the bottom portion of the evaporator E meets a propelled stream of lean inert gas which is supplied to the evaporator from the circulating fan F by way of the conduit 16, the gas heat exchanger G and the conduit 17.

It is preferred to use an evaporator of the type in which the inert gas circulates with a velocity sufficient to sweep or drag the liquid refrigerant therethrough as it is evaporating to produce the refrigerating effect. In the evaporator illustrated there is also provided an upper enlarged diameter finned box-cooling conduit 18 through which the liquid refrigerant may flow by gravity if desired.

The evaporator has been illustrated herein only diagrammatically. A preferred detail construction of evaporator is disclosed and claimed in the co-pending application of Curtis C. Coons and William H. Kitto, Serial No. 386,395, filed April 2nd, 1941, which is a continuation-in-part of application Serial No. 220,189, filed July 20th, 1938. However, it is to be understood that various other forms of evaporators may be utilized with the present invention, for example, the conventional gravity flow type.

The rich gas formed in the evaporator E is conveyed therefrom to the bottom portion of the absorber A by way of the conduit 20, the gas heat exchanger G, and a conduit 21. The rich gas flows upwardly through the absorber A in counterflow relationship with lean absorption solution flowing downwardly therethrough and in intimate contact with such solution. The manner in which the solution is supplied to the absorber will be described in detail hereinafter. The absorption solution absorbs refrigerant vapor from the inert gas refrigerant vapor mixture supplied through the conduit 21, and the resulting heat of absorption is rejected to the cooling air flowing over the exterior walls of the absorber and the air-cooling fins mounted thereon. The lean gas formed in the absorber is conveyed from the upper portion thereof to the suction inlet of the circulating fan F by way of the conduit 22, thus completing the inert gas circuit.

The lean solution produced in the boiler B by the generation of refrigerant vapor is conveyed therefrom to the solution reservoir S by way of the conduit 25, the liquid heat exchanger L, and a looped finned solution pre-cooling conduit 26. The reservoir S is vented by means of a conduit 27 to the suction conduit 22 of the circulating fan F whereby the liquid level in the reservoir S is substantially stabilized and the liquid level in the reservoir S is higher than that prevailing in the boiler-analyzer system by an amount sufficient to balance the pressure differential between the conduit 22 to which the reservoir is vented and the upper rich gas portion of the gas heat exchanger G to which the boiler-analyzer condenser system is vented by way of the conduit 14.

The lean solution is conveyed from the reservoir S into the suction conduit 22 adjacent its point of connection to the upper portion of the absorber A by means of a gas lift pumping conduit 28. Pumping gas is supplied to the conduit 28 below the liquid level normally prevailing therein by means of a conduit 29 which is connected to the discharge conduit 16 of the circulating fan F.

The lean solution supplied to the conduit 22 flows downwardly through the absorber A by gravity in counterflow relationship with the pressure equalizing refrigerant vapor mixture flowing upwardly therethrough. The rich solution produced in the absorber is conveyed from the bottom portion thereof to the upper portion of the analyzer D by means of the conduit 31, the liquid heat exchanger L, and the conduit 32. This completes the absorption solution circuit.

The heater H for the boiler B is supplied with fuel by means of a conduit 35 which includes a solenoid control valve 36 of the type normally urged to closed position. A by-pass 37 is provided around the valve 36 in order to maintain a small pilot or igniting flame on the burner H which will include suitable safety cut-off mechanism (not shown) of a type to discontinue the supply of fuel thereto completely upon the total failure of the flame.

The apparatus is controlled by means of a suitable thermostatic control mechanism 40 which includes a capillary connecting conduit and bulb element 41 which may be positioned to respond to the temperature of the space to be refrigerated or to the temperature of the evaporator in the manner shown. The mechanism 40 may be of any desired or conventional type and is well known, consisting principally of a thermostatically controlled switch and a mechanism for adjusting its control point. Electrical energy is supplied to the mechanism 40 by means of electrical supply lines 42. The mechanism 40 exercises direct control over the solenoid valve 36 to which it is connected by the electrical conductors 43.

The control mechanism 40 also controls the energization of supply lines 44 which lead to an auxiliary motor control mechanism indicated generally at 45 in Figure 1.

The motor control mechanism 45 is provided with a pressure sensitive thermostatic bellows 48 which is actuated in response to the temperature of the cooling air flowing over the absorber and condenser by means of a capillary conduit 49 which carries a finned bulb element 50 on its end portion whereby the bellows 48 expands and contracts in response to variations in the temperature of the cooling air.

One end of the bellows 48 is rigidly mounted on a casing element 51 by means of a nut 52. The other end of the bellows 48 is provided with an extending shaft 53 provided with a reduced diameter slot 54 adjacent its end portion. The slot 54 receives a part of a snap acting toggle mechanism which is indicated generally at 55 in order to actuate the same.

The free arm 56 of the toggle mechanism carries electrical conductor plates 57 on its free end portion in position to contact electrical contactors 58 and 59 which are positioned on the right and left hand sides thereof respectively, as viewed in Figure 2, and in spaced relationship.

The motor M is provided with two windings 60 and 61 which are 4 and 6-pole windings, respectively. These windings are shown schematically in Figure 2 and will be arranged in a known manner in the motor. The motor is preferably of the induction type in which a sealing shell is provided between the stator windings and the rotor in order to seal the refrigerating system and to prevent the contents thereof from coming in contact with the stator windings.

The electrical contact 59 is connected to one end of the 4-pole winding 60 by means of a conductor 63 and the electrical contact 58 is connected to one end of the 6-pole winding 61 by means of an electrical conductor 64. The opposite ends of the windings 60 and 61 are connected together by means of a conductor 65. The conductor 65 then connects directly to a supply wire 66, the energization of which is controlled by the main control mechanism 40. It will be understood that the conductor 66 will be housed within the cable 44 connecting the control elements 40 and 45. The movable arm 56 of the toggle mechanism is supplied with electrical current through a conductor 67 which also connects to the control mechanism 40 and is included within the cable 44. As is shown in Figure 1, the various electrical connections between the control mechanism 45 and the motor M are housed within a suitable cable 68.

The above described refrigerating system will be associated in the usual manner with an insulated cabinet preferably of the type which is provided with a rear cooling flue in which the condenser is housed and a lower mechanism compartment in which the absorber is housed. The bulb 50 which is designed to respond to the temperature of the cooling air supplied to the absorber may be positioned in the mechanism compartment directly beneath the absorber in which event it will respond to the temperature of the cooling air before it traverses the absorber, or it may be positioned in the rear air-cooling flue in which event it will respond to the temperature of the cooling air which has traversed the absorber. In either event suitable calibration of the bellows 48 will be provided to assure proper operation of the system.

An induction motor provided with 4 and 6-pole windings energized from 60 cycle alternating current will have synchronous speeds of 1800 R. P. M. and 1200 R. P. M., respectively. Such a motor will have operating speeds of approximately 1700 R. P. M. and 1130 R. P. M., respectively. However, if it is desired to decrease the speed differential the motor can be designed to have much greater slip when operating with 4-poles, for example, to bring the actual 4-pole running speed down as low as 1500 R. P. M. if desired.

The operation of this form of the invention is as follows: Assuming that there is a demand for refrigeration and that atmospheric temperature conditions are relatively low, for example, approximately in the neighborhood of 70° F., the control mechanism 40 will energize the heater for the boiler B and will energize the supply connections to the motor control 45. At low room temperatures the bellows 48 will have contracted and will have actuated the toggle mechanism to the right, as viewed in Figure 2, to energize the 6-pole motor winding through the contact 58. Under these conditions the motor will operate at slow speed and hence the circulating fan F will generate a relatively low discharge pressure.

The apparatus is designed in such fashion that satisfactory operation will be achieved with low discharge pressure from the circulating fan with room temperatures up to, for example, 90° F. Under these conditions the rate of solution circulation is determined by the depth of immersion of the pump which is fixed by the quantity of solution in the apparatus and the relative positions of the various parts thereof. Therefore, the rate at which the inert gas circulates is designed to provide adequate solution circulation, adequate inert gas circulation and adequate distribution of the liquid refrigerant in the evaporator at the low, or 6-pole speed of the circulating motor and its associated fan.

As the room temperature gradually increases the operating temperature of the absorber increases correspondingly as the absorber must reject its heat to the cooling air flowing thereover. An increase in the temperature of the cooling air for the absorber causes the same to operate at a higher temperature which decreases its ability to absorb the refrigerant vapor from the mixture supplied by the conduit 21. As a result of the decreased efficiency of the absorber the lean gas which is returned to the evaporator contains a higher concentration of refrigerant vapor which decreases by so much the ability of the inert gas in the evaporator to promote evaporation of the liquid refrigerant supplied to the condenser. If appropriate steps are not taken this phenomena will go on progressively until the capacity of the system is seriously impaired.

The present invention overcomes this difficulty by stepping up the motor speed as the room temperature approaches a high value, say for example 90° F. This is accomplished as follows: When the room temperature passes the 90° mark, the bellows 48 expands in response thereto and actuates the toggle mechanism 55 to the left, as viewed in Figure 2, to de-energize the 6-pole winding 61 of the circulating motor and to energize the 4-pole winding 60 thereof. Since the motor now has a lesser number of poles it will operate at a considerably higher speed and the circulating fan F will circulate the inert gas at a greater velocity due to the greater pressure differential produced thereby.

Since the gas lift pumping mechanism comprising the conduits 28 and 29 are connected directly across the circulating fan F, this increase in the discharge pressure of the fan results in an increase in the pressure of the gas supplied to the conduit 29 and consequently an increase in the rate of circulation of the absorption solution.

Since the absorption solution is now circulating at a greater rate and since the inert gas is also circulating at a higher rate the absorber is now able to maintain the concentration of refrigerant vapor in the lean gas within desired limits even at the high temperatures at which it is operating. This results partly from the fact that there is now a greater quantity of absorption solution available in the absorber per unit of time to absorb the refrigerant vapor picked up by the inert gas in the evaporator per unit of time. Also the concentration of the rich gas which is returned from the evaporator to the absorber is somewhat reduced because of the greater quantity of inert gas circulating through the evaporator and the increased flow of the solution and increased velocity of the inert gas from the absorber results in greater turbulence in the fluids therein and in improved scrubbing action of the same along the walls of the absorber which improves the heat rejection and absorption.

Consequently, the present form of the invention provides a construction whereby the rate of circulation of the fluids in the apparatus are automatically stepped up as an operating condition of the apparatus changes, the room temperature increases, in order to maintain the operating characteristics of the system and the proper balance between the concentration in the various fluids found in various parts thereof.

Referring now to Figures 3 and 4 there is disclosed a modified form of the invention. Since this form of the invention differs from that previously described in connection with Figures 1 and 2 only in the construction of the absorption solution circuit, only that part of the apparatus has been illustrated, it being understood that the other parts are identical with that disclosed in connection with Figures 1 and 2. Certain elements of the apparatus disclosed in Figures 2 and 3 are identical with apparatus described and illustrated in connection with Figures 1 and 2 and are therefore given the same reference characters primed.

In this form of the invention, however, the circulating fan F' is driven by an electrical motor 70 which has but a single operating speed.

In this form of the invention the circulating motor 70 and the heater for the boiler B', which may be identical with that disclosed in connection with Figures 1 and 2 or which may be of any other preferred and desired type, will be directly under the control of a control mechanism such as that disclosed at 40 in connection with Figures 1 and 2.

In this form of the invention, however, the conduit 22 connecting the upper portion of the absorber to the suction side of the circulating fan has been replaced by a pair of spaced conduits 71 and 72 connected by a control valve casing and sleeve 73. The vent conduit 27' from the reservoir S' and the gas lift pumping conduit 28' each connect to the conduit 71 which connects directly to the upper portion of the absorber A'.

The sleeve 73 is connected to the discharge conduit 16' of the circulating fan F' by means of a by-pass conduit 75. A throttling valve plug 76 is mounted within the sleeve 73 in position to control communication between the by-pass 75 and the interior of the sleeve 73. The valve plug 76 is carried and actuated by a bimetallic thermostatic element 77 which is rigidly mounted at 78 on the interior of the sleeve 73.

The operation of this form of the invention is as follows: When the room temperature is say 70° or below, the thermostat 77 will have shifted the valve plug 76 to the left, as viewed in Figure 4, to provide free communication between the by-pass conduit 75 and the interior of the valve sleeve 73, thus appreciably reducing the effective quantity of inert gas circulating through the inert gas circuit and the effective pressure in the conduit 16' beyond its point of connection with the by-pass 75 and hence the effective pressure in the conduit 29'.

The thermostat 77 does not respond directly to the temperature of the cooling air flowing over the absorber A' but to the temperature of the lean gas flowing through the sleeve 73. However, the lean gas temperature is a direct function of the temperature of the cooling air and appropriate calibration of the thermostat 77 is readily accomplished.

Now assuming that the temperature of the cooling air gradually increases, the temperature of the lean gases flowing through the sleeve 73 will also gradually increase and will affect the thermostat 77 to cause the same to flex to the right, as viewed in Figure 4, thereby gradually throttling the connection between the by-pass 75 and the sleeve 73. The thermostat may also be calibrated to close the by-pass 75 completely when the cooling air temperature reaches a predetermined value, say for example 100° F.

As the by-pass 75 is gradually throttled the quantity of inert gas which is circulating in the inert gas circuit proper will gradually increase as will the pressure of the pumping gas supplied to the pumping conduit 28' by the conduit 29'. Consequently the rate of inert gas circulation and the rate of absorption solution circulation gradually increases with increasing atmospheric temperature conditions to compensate the apparatus for the same to maintain proper concentration of the inert gas supplied to the evaporator and to provide an adequate quantity of absorption solution per unit of time to the absorber to insure that the refrigerant vapor picked up in the evaporator per unit of time will be efficiently absorbed in the solution and returned to the boiler for further vaporization. Therefore, in this form of the invention the rate of solution circulation and the effective rate of inert gas circulation is varied infinitely between a low temperature and a high temperature condition as determined by operating conditions of the apparatus to maintain normal operating conditions therein.

In each form of the invention herein disclosed means are provided for varying the rate of inert gas circulation and the rate of solution circulation in a three-fluid absorption refrigerating apparatus to maintain efficient operating conditions thereof under varying conditions of cooling air temperature and without altering the effective charge of the system in any way.

While the invention has been illustrated and described herein in considerable detail, various changes may be made in the form, construction and arrangement of parts without departing from the spirit of the invention or the scope of the appended claims.

I claim:

1. Absorption refrigerating apparatus comprising an inert gas circuit including an evaporator and an absorber, a solution circuit including a generator and said absorber, means for liquefying refrigerant vapor produced in said generator and for supplying the liquid to said evaporator, a gas lift conduit included in said solution circuit for circulating the solution, means for supplying pumping gas from said inert gas circuit to said gas lift conduit to operate the same, and means for varying the pressure of the gas supplied to said gas lift conduit in response to changes in a condition affecting the operation of the apparatus.

2. Absorption refrigerating apparatus comprising an inert gas circuit including an evaporator and an absorber, a solution circuit including a generator and said absorber, means for liquefying refrigerant vapor produced in said generator and for supplying the liquid to said evaporator, a gas lift conduit included in said solution circuit for circulating the solution, means for supplying pumping gas from said inert gas circuit to said gas lift conduit to operate the same, means for producing a pressure differential in said inert gas circuit to cause circulation of the inert gas, and means responsive to the ambient temperature for changing the effective inert gas flow producing pressure differential whereby to alter the rate of inert gas and solution circulation.

3. Absorption refrigerating apparatus comprising an inert gas circuit including an evaporator and an air-cooled absorber, a solution circuit including a generator and said absorber, means for liquefying refrigerant vapor produced in said generator and for supplying the liquid to said evaporator, a gas lift conduit included in said solution circuit for circulating the solution, means for supplying pumping gas from said inert gas circuit to said gas lift conduit to operate the same, and means responsive to the temperature of the cooling air supplied to the absorber for regulating the rates of solution and inert gas circulation.

4. Absorption refrigerating apparatus comprising an inert gas circuit including an evaporator and an air-cooled absorber, a solution circuit including a generator and said absorber, means for liquefying refrigerant vapor produced in said generator and for supplying the liquid to said evaporator, a gas lift conduit included in said solution circuit for circulating the solution, means for supplying pumping gas from said inert gas circuit to said gas lift conduit to operate the same, power driven means for propelling the inert gas through said inert gas circuit, said gas lift conduit discharging into an area subject to the low pressure side of said propelling means, said gas supply means connected to the high pressure side of said propelling means, and thermostatic means responsive to the thermal condition of the cooling air for said absorber arranged to regulate the rate of inert gas circulation and the pressure of the pumping gas supplied to said gas lift conduit.

5. Absorption refrigerating apparatus comprising an inert gas circuit including an evaporator and an absorber, a solution circuit including a generator and said absorber, means for liquefying refrigerant vapor produced in said generator and for supplying the liquid to said evaporator, a gas lift conduit included in said solution circuit for circulating the solution, means for supplying pumping gas from said inert gas circuit to said gas lift conduit to operate the same, a power driven inert gas circulator in said inert gas circuit, and means responsive to a thermal condition affecting normal operation of the system for varying the capacity of said circulator in response to changes in such thermal condition.

6. Absorption refrigerating apparatus comprising an inert gas circuit including an evaporator and an air cooled absorber, a solution circuit including a generator and said absorber, means for liquefying refrigerant vapor produced in said generator and for supplying the liquid to said evaporator, a gas lift conduit included in said solution circuit for circulating the solution, means for supplying pumping gas from said inert gas circuit to said gas lift conduit to operate the same, a power driven inert gas circulator in said inert gas circuit, a by-pass around said inert gas circulator, and means responsive to a thermal condition affecting the operation of the system for varying the effective capacity of said by-pass in accordance with such condition.

7. Absorption refrigerating apparatus comprising an inert gas circuit including an evaporator and an air-cooled absorber, a solution circuit including a generator and said absorber, means for liquefying refrigerant vapor produced in said generator and for supplying the liquid to said evaporator, a gas lift conduit included in said solution circuit for circulating the solution, means for supplying pumping gas from said inert gas circuit to said gas lift conduit to operate the same, a motor driven circulating fan in said inert gas circuit, said motor having a plurality of windings having different operating characteristics, means for heating said generator, means responsive to the temperature of the cooling air for conditioning a selected one of said motor windings for energization in accordance with such temperature, and refrigeration demand responsive means for governing the operation of said heater and the energization of said selected winding.

8. Absorption refrigerating apparatus comprising an inert gas circuit including an evaporator and an absorber, a solution circuit including a generator and said absorber, means for liquefying refrigerant vapor produced in said generator and for supplying the liquid to said evaporator, a gas lift conduit included in said solution circuit for circulating the solution, means for supplying pumping gas from said inert gas circuit to said gas lift conduit to operate the same, a power driven inert gas circulator in said inert gas circuit, a by-pass around said inert gas circulator, a throttling valve in said by-pass and a thermostat arranged to be responsive to the temperature of the lean gas leaving said absorber for actuating said throttling valve to decrease the gas flow through said by-pass as the temperature of such lean gas rises.

9. That improvement in the art of refrigerating systems of the type utilizing a refrigerant, an absorbent therefor and a pressure equalizing medium inert with respect to the refrigerant and absorbent which includes the steps of expelling refrigerant vapor from solution in the absorbent by the application of heat thereto, liquefying the vapor so produced, evaporating the liquid into a moving stream of the pressure equalizing medium, absorbing the refrigerant vapor from the refrigerant vapor pressure equalizing medium mixture by contacting the same with a stream of absorbent solution previously weakened by the expulsion of refrigerant vapor therefrom, and regulating the relative proportions of absorption solution and of pressure equalizing medium brought into contact with the refrigerant vapor pressure equalizing medium mixture and the liquid refrigerant per unit of time respectively in accordance with a condition affecting the operation of the system.

10. That improvement in the art of refrigerating systems of the type utilizing a refrigerant, an absorbent therefor and a pressure equalizing medium inert with respect to the refrigerant and absorbent which includes the steps of expelling refrigerant vapor from solution in the absorbent by the application of heat thereto, liquefying the vapor so produced, evaporating the liquid into a body of pressure equalizing medium circulating between evaporating and absorbing zones, circulating absorbing solution through the absorbing zone by diverting pressure equalizing medium under pressure from the circulating body of pressure equalizing medium and introducing it into an upstanding body of absorbent solution, and regulating the operating characteristics of the system by altering the rates of circulation of the pressure equalizing medium and of the absorbent solution in accordance with ambient temperature.

11. That improvement in the art of refrigerating systems of the type utilizing a refrigerant, an absorbent therefor and a pressure equalizing medium inert with respect to the refrigerant and absorbent which includes the steps of expelling refrigerant vapor from solution in the absorbent in a generating zone by the application of heat thereto, liquefying the vapor so produced, circulating the pressure equalizing medium between evaporating and absorbing zones by creating a flow producing pressure differential in a localized area of the system containing pressure equalizing medium, circulating the absorbing solution between the generating and absorbing zones by subjecting the solution to the circulating action of pressure equalizing medium in a localized area of the system containing absorbing solution, rejecting the heat of absorption to the surrounding air, and governing the operation of the system by altering the effective flow producing value of said pressure differential in response to changes in air temperature.

12. Absorption refrigerating apparatus of the three-fluid type including a boiler, an absorber, a condenser and an evaporator connected in circuit, power driven means for circulating inert gas and absorbing solution in said apparatus, and means responsive to the heat rejecting capacity of said absorber and condenser for governing the rates of inert gas and absorbing solution circulation in accord therewith.

13. Absorption refrigerating apparatus of the three-fluid type including a boiler, an air-cooled absorber, a condenser and an evaporator connected in circuit, power driven means for circulating an inert gas through said evaporator and said absorber, a circulating pump for circulating an absorbing solution between said boiler and said absorber, and means responsive to cooling air temperature for regulating the rates of circulation of said inert gas and said absorption solution.

14. Absorption refrigerating apparatus comprising an inert gas circuit including an evaporator and an absorber, a solution circuit including a generator and said absorber, means for liquefying refrigerant vapor produced in said generator and for supplying the liquid to said evaporator, means in said inert gas circuit for creating a gas flow producing pressure differential in a local area thereof, and means for by-passing inert gas around said pressure differential flow producing means in response to changes in a condition affecting the operation of the apparatus to compensate the apparatus for changing conditions.

15. Absorption refrigerating apparatus comprising an inert gas circuit including an evaporator and an absorber, a solution circuit including a generator and said absorber, means for liquefying refrigerant vapor produced in said generator and for supplying the liquid to said evaporator, a power operated inert gas circulating means in said inert gas circuit, a by-pass in said inert gas circuit around said power operated circulator, and thermostatic means arranged to vary the flow capacity of said by-pass in response to a thermal condition affecting the operation of the apparatus.

16. Absorption refrigerating apparatus comprising an inert gas circuit including an evaporator and an air-cooled absorber, a solution circuit including a generator and said absorber, means for liquefying refrigerant vapor produced in said generator and for supplying the liquid to said evaporator, a gas lift conduit included in said solution circuit for circulating the solution, means for supplying pumping gas from said inert gas circuit to said gas lift conduit to operate the same, means in said inert gas circuit for creating a pressure differential therein sufficient to operate said gas lift and to circulate the inert gas through said evaporator with sufficient velocity and pressure to circulate the liquid refrigerant in said evaporator by the frictional dragging action of the inert gas flowing in contact with the liquid refrigerant, and means for varying the pressure of the gas supplied to said gas lift conduit in response to changes in a condition affecting the operation of the apparatus.

DONALD G. SMELLIE.